(12) United States Patent
Saravani

(10) Patent No.: US 10,502,302 B2
(45) Date of Patent: Dec. 10, 2019

(54) HYDRAULIC LIMITED DIFFERENTIAL SLIP

(71) Applicant: Amir Aghabeygi Saravani, Tehran (IR)

(72) Inventor: Amir Aghabeygi Saravani, Tehran (IR)

(*) Notice: Subject to any disclaimer, the term of this patent is extended or adjusted under 35 U.S.C. 154(b) by 187 days.

(21) Appl. No.: 15/870,934

(22) Filed: Jan. 13, 2018

(65) Prior Publication Data
US 2018/0335122 A1 Nov. 22, 2018

(30) Foreign Application Priority Data
May 20, 2017 (IR) .................. 139650140003002236

(51) Int. Cl.
| | |
|---|---|
| *F16H 48/27* | (2012.01) |
| *F16H 48/08* | (2006.01) |
| *F16H 48/32* | (2012.01) |
| *F04C 2/18* | (2006.01) |
| *F16H 48/38* | (2012.01) |
| *F04C 14/24* | (2006.01) |
| *F04C 2/08* | (2006.01) |

(52) U.S. Cl.
CPC ............. *F16H 48/27* (2013.01); *F04C 2/18* (2013.01); *F04C 14/24* (2013.01); *F16H 48/08* (2013.01); *F16H 48/32* (2013.01); *F16H 48/38* (2013.01); *F04C 2/084* (2013.01); *F16H 2048/385* (2013.01)

(58) Field of Classification Search
CPC ...................................................... F16H 48/27
See application file for complete search history.

(56) References Cited

FOREIGN PATENT DOCUMENTS

| | | | | |
|---|---|---|---|---|
| DE | 4022839 A1 * | 1/1992 | ............ | B60K 23/04 |
| GB | 2451887 A * | 2/2009 | ............ | F16H 48/26 |

* cited by examiner

*Primary Examiner* — Derek D Knight

(57) ABSTRACT

A positive displacement pump for hydraulic limited differential comprises a first external gear and a second external gear juxtaposed inside a casing, wherein one or more outer teeth sections of the external gear are tangential to the casing. The casing is filled with a fluid via an opening and sealed using a plug member on both sides to define a fluid tight sealing configuration and a pair of shafts are configured to couple the first external gear and the second external gear. The clockwise rotation of the first external gear is configured to drive the second external gear in counter clockwise direction in the casing to allow the movement of the fluid inside the casing via one or more countersinks to create a pressure difference for internal circulation of the fluid in the permitted gaps to control the differential slip for increasing the stability of the driving vehicle.

18 Claims, 7 Drawing Sheets

HYDRAULIC LIMITED DIFFERENTIAL SLIP

BACKGROUND OF THE INVENTION

Differentials are primarily aimed at adequately transferring rotational torque when there are differences on rotational speeds between the opposite output axle shafts of wheels on the automobile. Differential slip is a factor which causes the automobile to slip on the slippery surfaces such as the ice surface and rocks and eventually, the automobile stops moving. When the vehicle moves in a straight line, the right and left wheels spin together with the same speed, but when it turns, the wheels near the turn center traverse less distance and on the other hand, the wheels distant from the turn center makes a turn to cover more distance. Therefore, the wheels near the turn center should spin with less speed than the wheels that are away from the center of turn. To change the speed of the wheels of the vehicle especially in road turns, a complex called differential is used.

However, the open differential while retaining balance in wheels, is associated with more problems. The differential spins the wheel faster which has less inhibiting force. Therefore, if the friction of any wheel is reduced for any reasons, the wheel spins with more speed. This differential slip causes energy dissipation and instability when moving on the slippery surface and even stop of the vehicle. The problem is more in heavy vehicles and agricultural machineries, which move in uncommon routes. When dropped in the mud or being on the slippery surface of the ice, the friction of one of the wheels is reduced with the ground. The wheel with the less friction spins faster and consequently, the other wheel which has a proper friction with the ground spins slowly. This phenomenon could lead to the stoppage of the vehicle or it might get stuck. This problem could be easily noticed by jacking under one of the wheels and separating it off the ground. In this case, when the engine power is transferred to the wheels, the wheel is separated from the ground and receives the entire force and eventually the vehicle will not move.

Several systems and methods are available in the prior art to solve the limitations of the open differential in constraining the tire slip. One of the widely used technique is locking differentials. This type includes components like that of the open differentials, in addition, a pneumatic or hydraulic-electrical mechanism to lock the two output gears to each other. Commonly, this mechanism is activated by a switch, when activated, both wheels will spin with the same speed. Differential lock types comprise Non-spin locker differential, E-locker differential and gearless differential lock. In non-spin locker type, the engaging power is provided by a high-pressure air compressor. One of its prime advantage is problem free and quite convenient installation on various types of differentials. In E-locker type, the differential is locked by a strong magnet and the driver could activate differential lock by pressing a button from inside the car. However, this is an expensive model. Gearless differential lock is primarily used for light weight vehicles.

There are many mechanisms available in the prior art which uses limited differential slip. Limited differential slip is configured to limit the slip to an acceptable level. When one of the wheel slips, the differential allows more torque to be transferred to the wheel which does not slip. Some of the types are a) Clutched limited slip differential which is a commonly used type which includes all the differential components along with springs and clutches. Some of them have a conical clutch just as the coordinator in manual power transmission system. The spring pushes the lateral gears, which are connected to the casing, into the clutches. When the wheels move with the same speed, both lateral gears spin along with the casing and there is no need for clutches. Only when an agent causes one of the gears spin with more speed than the other, the clutch acts. If one of the gears wants to spin more quickly, it should first overcome the clutch. However, if one of the wheels is on the ice and the other one has sufficient friction to move, with limited slip differential, although the wheel on the ice is not able to transmit more torque to the ground. The other wheel still receives the torque required to move.

Another technique is viscous coupling wherein two sets of plates container in a chamber filled with thick liquid. Each set of plates is connected to one of the output shafts. The plate set, and the thick liquid rotate with the same speed but, when one of the wheels rotates faster, the plate set connected to this wheel and rotates more quickly than the other set of plates. The thick liquid trapped between the plates desires to rotate with the same speed as the faster and slower plates do. However, this differential is not effective, and limitation is that when one of the wheels starts to slip, no torque is transmitted.

Another technique is using torsion differential which is a completely mechanical device that does not include the use of electronics or clutched system or a thick liquid. When the torque transmitted to both wheels are same, it works as an open differential. The torque difference makes the gears to be constrained to each other in the Torsion differential. Major drawback in this type of differential is that when one of the wheels is separated completely off the ground, Torsion differential will not able to transmit any torque to other wheel. The reason for this issue is that tendency to torque change will determine the amount of the torque transmitted.

Electronic systems are also used for stability control by minimizing the automobile slip in turns. ASR and dynamic drive system using electronics are also used to retain stability by reducing the engine power or braking on wheels spinning redundantly. Sometime, the friction of the tires is improved to prevent the differential slip in turns. However, all the above-mentioned methods and systems have limitations in achieving the reduction of differential slip. Limitations such as complex and cumbersome design increases the production cost and lifetime is very less. Depreciation cost is also high and some of them are fully automatic which reduces the adaptability of the system. Some of the methods aren't successful in riding impassable areas. Most of the system uses clutch plates as a part of their design which further causes strain and wear on drive-train components along with causing greater energy consumption required to overcome the friction.

Most of the current techniques employing additional consumable mechanical components such as clutch plates, spring members, high pressure rotating seals, disc members and coupling device to adjust the amount of slip tailored for the conditions of the driven vehicle. However, these systems continue to cause more wear in the moving components which requires repeated maintenance and thereby increasing the cost. The depreciation level is also very low. Further, most of the designs are cumbersome and the reliability on the efficiency of the system is very minimal. Current techniques do not allow precise adjustment of the rate of differential for the slip in the vehicle based on the driving conditions.

Prior art reference U.S. Pat. No. 8,202,189 B2 discloses a limited slip differential wherein a driving plate, backing plates, differential gear assemblies, and a transmission assembly engaged together inside a sealed casing where fluid is pumped. The rotational speed difference of axle shafts of the vehicle exceeds a threshold value, the LSD applies at least one gear assembly to generate a back pressure and efficiently block the fluid passing through the gears for limiting mutual rotational speed difference, hence achieving a limited-slip effect. However, this design is complex and using more consumable parts such as driving and backing plates that causes more wear.

Thus, in light of aforementioned drawbacks, there is a clear and present need for a simple limited differential design in automobile vehicles to constraint the tire slip for increasing the stability of the automobile while driving on the slippery roads.

SUMMARY OF THE INVENTION

The present invention relates to a hydraulic limited differential in a vehicle to constrain the tire slip and preventing the vehicle from getting stuck in the mud thereby increasing the stability of the automobile during driving on slippery roads.

In one embodiment, a positive displacement hydraulic pump for limited differential in a vehicle comprises a first external gear and a second external gear juxtaposed inside a casing, wherein one or more outer teeth sections of the external gear are tangential to the casing. A crown wheel is configured to encompass the casing and takes the receiving force from a pinion to drive the axle shafts of the vehicle via the positive displacement pump.

In one embodiment, the casing is filled with a fluid via an opening and sealed using a plug member on both sides to define a fluid tight sealing configuration. A pair of shafts are configured to couple the first external gear and the second external gear, wherein the clockwise rotation of the first external gear is configured to drive the second external gear in counter clockwise direction in the casing to allow the movement of the fluid inside the casing. A channel disposed in the casing configured to connect one or more countersinks created on both sides of the first external gear and the second external gear respectively, wherein the movement of the fluid in the casing creates a pressure difference in the countersinks to circulate the fluid internally via the permitted gaps and the slips to control the differential slip for increasing the stability of the driving vehicle. The countersinks are nothing, but area defined on both sides of the first external gear and the second external gear of the positive displacement pump.

In one embodiment, the hydraulic limited differential is implemented in the vehicle using four gears for axle shaft alignment with the crown wheel. A pair of side gears and a pair of support gears are mounted on the shafts coupled to the first external gear and the second external gear for alignment with the crown wheel. The support gears are positioned concentrically with the crown wheel and the axle shafts of the vehicle are connected to the support gears for transferring the traction force for differential adjustment to control the slip in the vehicle.

In another embodiment, the hydraulic limited differential comprises a channel in the casing to control the movement of the fluid based on the internal circulation. A valve disposed in the casing configured to control the movement of the fluid in the channel. The valve is configured to limit the differential slip in at least one of a manual and an automatic method depending on the stability requirements of the vehicle.

One aspect of the present disclosure is directed to a positive displacement pump for hydraulic limited differential in a vehicle, comprising: (a) a first external gear and a second external gear juxtaposed inside a casing, wherein one or more outer teeth sections of the external gear are tangential to the casing; (b) a crown wheel is configured to encompass the casing and takes the receiving force from a pinion to drive the axle shafts of the vehicle via the positive displacement pump; (c) wherein the casing is filled with a fluid via an opening and sealed using a plug member on both sides to define a fluid tight sealing configuration; (d) a pair of shafts are configured to couple the first external gear and the second external gear, wherein the clockwise rotation of the first external gear is configured to drive the second external gear in counter clockwise direction in the casing to allow the movement of the fluid inside the casing; and (f) a channel is disposed in the casing configured to connect one or more countersinks created on both sides of the first external gear and the second external gear respectively, wherein the movement of the fluid in the casing creates a pressure difference in the countersinks to circulate the fluid internally via the permitted gaps and the slips to control the differential slip for increasing the stability of the driving vehicle.

In one embodiment, the fluid is an oil having a predetermined viscosity based on the configuration of the pump. In another embodiment, the fluid is configured to move from the high-pressure countersink to the low-pressure countersink to create the pressure difference to cause internal circulation of the fluid during the movement of the vehicle. In one embodiment, the amount of fluid movement from the high-pressure countersink to the low-pressure countersink is directly proportional to the rate of differential for the slip in the vehicle. In one embodiment, a pair of side gears mounted on a shaft extending from the first external gear and the second external gear and a pair of support gears are mounted on the axle shafts of the vehicle. In a related embodiment, one or more support gears are positioned concentrically with the crown wheel. In one embodiment, the axle shafts of the vehicle are connected to the support gears for transferring the traction force for differential adjustment to control the slip in the vehicle.

In one embodiment of the positive displacement pump, said pump further comprises a channel in the casing to control the movement of the fluid based on the internal circulation of the fluid. In a related embodiment, the channel in the casing is configured to connect the countersinks that causes the internal circulation of the fluid due to pressure difference. In one embodiment, the displacement pump further comprises a valve disposed in the casing configured to control the movement of the fluid in the channel. In one embodiment, the differential in the vehicle is locked when the internal circulation of the fluid in the pump is minimum. In one embodiment, the differential in the vehicle is configured to be open when the channel is open for movement of the fluid based on the internal circulation in the pump.

Another aspect of the present disclosure is directed to a positive displacement pump for hydraulic limited differential in a vehicle, comprising: (a) a first external gear and a second external gear juxtaposed inside a casing, wherein one or more outer teeth sections of the external gear are tangential to the casing; (b) a crown wheel is configured to encompass the casing and takes the receiving force from a pinion to drive the axle shafts of the vehicle via the positive displacement pump, wherein the axle shafts are configured to couple the first external gear and the second external gear; (c) a pair of side gears mounted on a shaft extending from the first external gear and the second external gear and a pair of support gears are mounted on the axle shafts of the vehicle, wherein the support gears are coupled to the first external gear and the second external gear for concentric alignment with the crown wheel; (d) wherein the casing is filled with a fluid via an opening and sealed using a plug member on both sides to define a fluid tight sealing configuration; (e) wherein the clockwise rotation of the first external gear is configured to drive the second external gear in counter clockwise direction in the casing to allow the movement of the fluid inside the casing; and (f) one or more countersinks are created on both sides of the first external gear and the second external gear, wherein the movement of the fluid in the casing via a channel from a high-pressure countersink to a low-pressure countersink creates a pressure difference to circulate the fluid internally via the permitted gaps and the slips to control the differential slip for increasing the stability of the driving vehicle.

In one embodiment, the side gears and support gears are enclosed by a shell member and fixedly attached to the plug member of the casing. In another embodiment, a valve disposed in the channel of the closed circuit is electronically controlled to selectively adjust the movement of the fluid in the channel to limit the differential slip. In yet another embodiment, the valve is configured to limit the differential slip in at least one of a manual and an automatic method depending on the stability requirements of the vehicle. The present invention is related to one type of hydraulic pump configuration for adjusting the differential slip in the vehicle. However, variety of hydraulic pumps made in different configuration could be added to the invention to achieve desired results with the same efficiency, without deviating from the aspects of the present invention.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to a limited differential slip in automobile vehicles, and more particularly relates to a hydraulic limited differential slip to constraint the tire slip for increasing the stability of the automobile while driving on the slippery roads.

Figure 1:
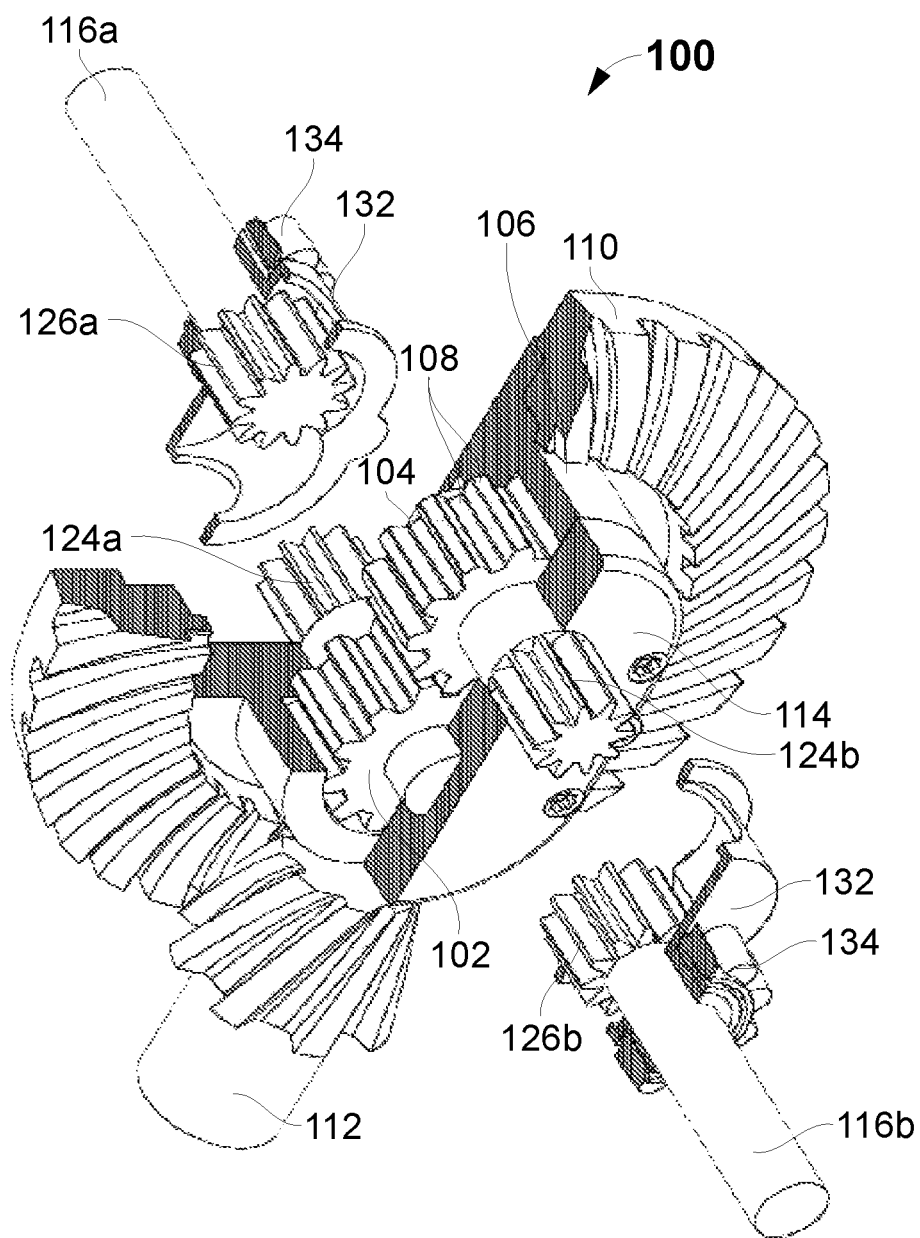
FIG. 1 illustrates an exploded view of the positive displacement pump for hydraulic limited differential in the vehicle, according to one embodiment.

According to an embodiment of the invention as shown in FIG. 1, an exploded view of a positive displacement pump 100 showing a casing 106, a plug member 114 and the arrangement of a first external gear 102 and a second external gear 104 is illustrated. The hydraulic limited differential in a vehicle is configured to constrain the tire slip and preventing the vehicle from getting stuck in the mud thereby increasing the stability of the automobile during driving on slippery roads.

Figure 2:
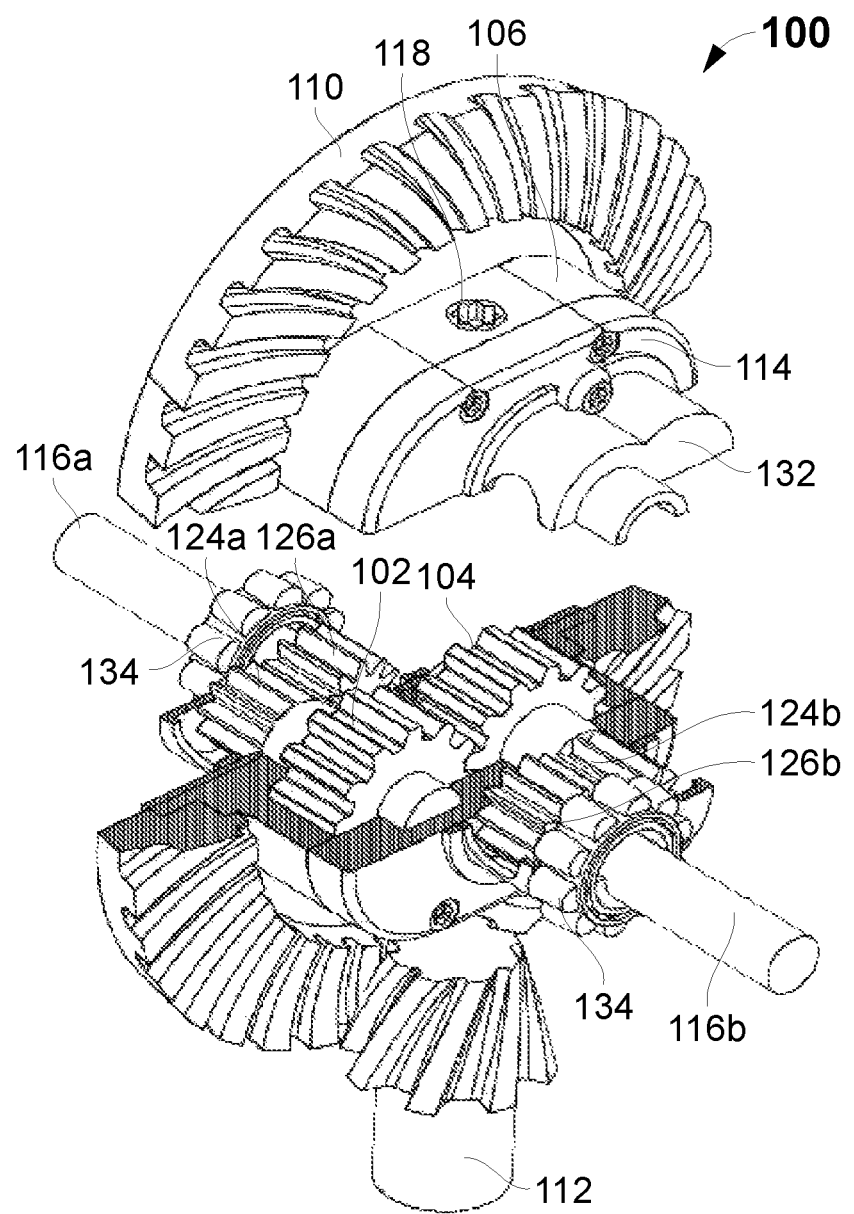
FIG. 2 illustrates a sectional view of the positive displacement pump showing the concentric arrangement of the gears and the plugs with the casing, according to one embodiment.

According to FIG. 1, the positive displacement pump 100 for hydraulic limited differential in a vehicle comprises a first external gear 102 and a second external gear 104 juxtaposed inside a casing 106, wherein one or more outer teeth sections 108 of the external gear (102, 104) are tangential to the casing 106. A crown wheel 110 is configured to encompass the casing 106 and takes the receiving force from a pinion 112 to drive the axle shafts of the vehicle via the positive displacement pump 100, wherein the casing 106 is filled with a fluid via an opening 118 and sealed using a plug member 114 on both sides to define a closed circuit as shown in FIG. 2. This configuration defines a fluid pump 100 with closed inlet and outlet to prevent and limit the differential slip.

Figure 4:
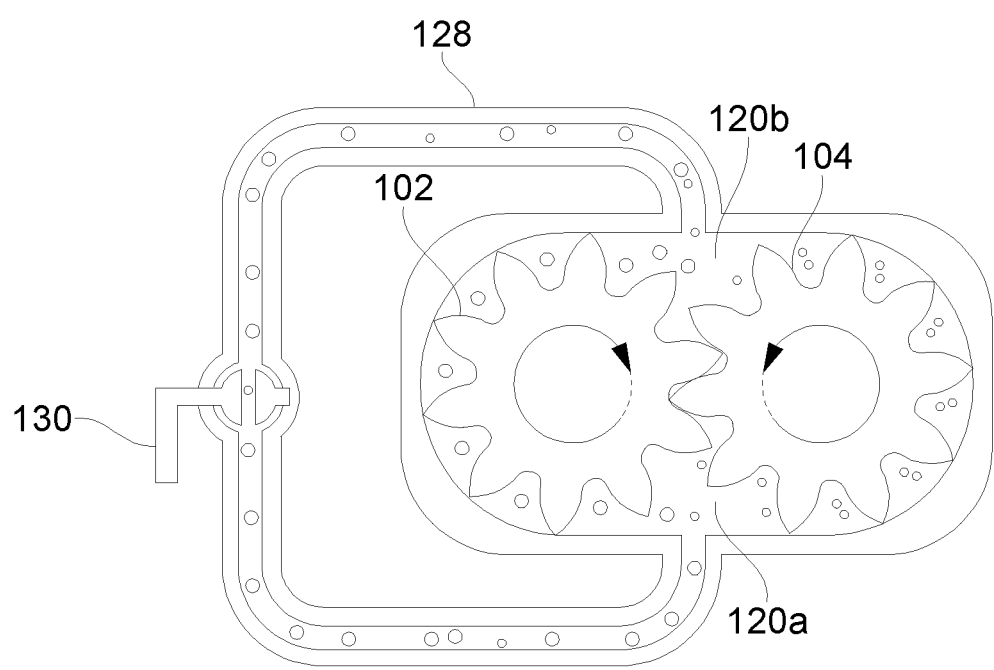
FIG. 4 illustrates the schematic of the closed-circuit design of the positive displacement pump for hydraulic limited differential in the vehicle, according to one embodiment.

According to one embodiment as shown in FIG. 2, the positive displacement pump 100 for hydraulic limited differential in a vehicle further comprises a pair of shafts (116a, 116b) configured to couple the first external gear 102 and the second external gear 104, wherein the clockwise rotation of the first external gear 102 is configured to drive the second external gear 104 in counter clockwise direction in the casing 106 to allow the movement of the fluid inside the casing 106. A channel 128 is disposed in the casing 106 configured to connect one or more countersinks (120a, 120b) created on both sides of the first external gear 102 and the second external gear 104 as shown in FIG. 4, wherein the movement of the fluid in the casing 106 creates a pressure difference in the countersinks (120a, 120b) to circulate the fluid internally via the permitted gaps and the slips to control the differential slip for increasing the stability of the driving vehicle. The countersinks (120a, 120b) are nothing, but area defined on both sides of the first external gear 102 and the second external gear 104 of the positive displacement pump 100.

Figure 3:
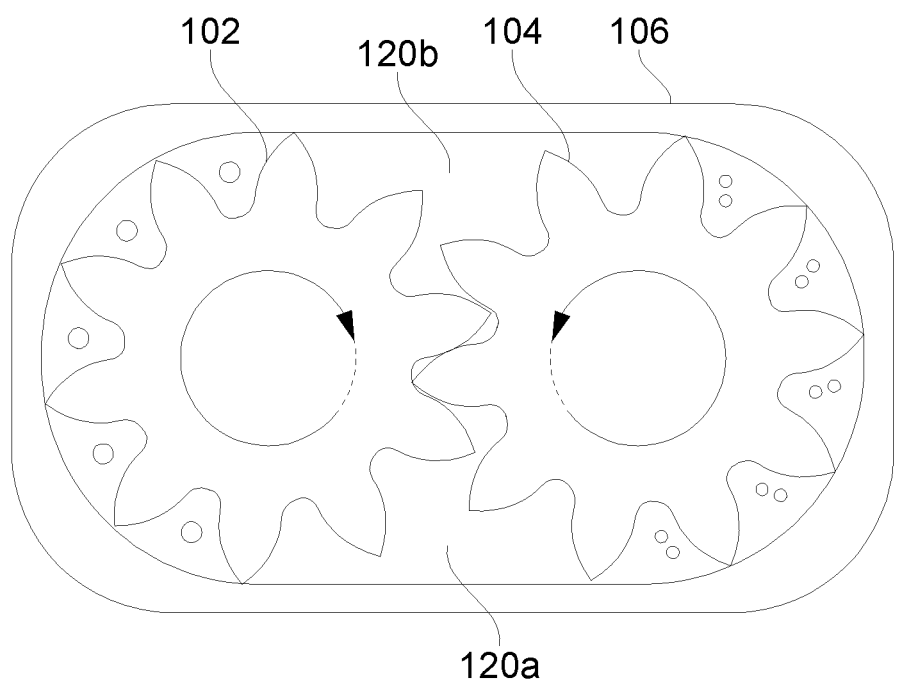
FIG. 3 illustrates a schematic of the internal circulation mechanism of the positive displacement pump for hydraulic limited differential in a vehicle, according to one embodiment.

In one embodiment as shown in FIG. 3, the fluid is configured to move from the high-pressure countersink 120a to the low-pressure countersink 120b to create the pressure difference to cause internal circulation of the fluid during the movement of the vehicle. The amount of fluid movement from the high-pressure countersink 120a to the low-pressure countersink 120b is directly proportional to the rate of differential for the slip in the vehicle. In preferred embodiments, the fluid is an oil having a predetermined viscosity based on the configuration of the pump 100. However, any kind of fluid could be used in the pump 100 to achieve the desired effect without deviating from the aspects of the present invention.

The countersinks are nothing, but the spaces created on the sides of the contact point of the first external gear 102 and the second external gear 104 when the plug member 114 is sealed on the casing 106. When the gears (102, 104) rotate, the pressure changes in the countersinks and based on the direction of rotation of the first external gear 102 and the second external gear 104, the pressure of the fluid drops in one side and rises in the other side. In another embodiment, an inlet and an outlet in the casing 106 for the movement of the fluid is closed to control the differential slip based on the internal circulation of the pump 100.

In other embodiments of the present invention as shown in FIG. 2, the opening 118 in the casing 106 defines the entry and bleeding path for the flow of the fluid inside the casing 106 of the pump 100 for differential slip during the movement of the vehicle. A coupling 122 is configured to seal the opening 118 to caulk the space inside the casing 106. The opening 118 is primarily used to fill and replace the fluid in the pump 100. This means that when the differential is operating, the pump 100 is filled with the fluid and the opening 118 is jammed at all the times using the coupling 122. Once the crown wheel 110 is encompassed on the casing 106, the plug member 114 is sealed on the casing 106 for a fluid tight fitting and the coupling 122 is used to seal the opening 118 to form a complete pump drive assembly for providing the precise differential control in the vehicle.

In preferred embodiments, there are two methods to use the pump 100 in the present invention. In general, in an external hydraulic gear pump, the fluid enters the inlet duct and is then evacuated through the outlet duct by the rotation of the gears. In one method as shown in FIG. 3, the inlet and outlet ducts must be completely jammed wherein the pump 100 is vacuumed and filled with fluid. In this case, when the gears rotate, the fluid attempts to move from region 120a to region 120b. However, region 120b is filled with fluid and so the pressure in this region tend to increase. When the pressure increases in region 120b, the fluid passes through the space (the allowed clearance) between the gear segments and reaches the region 120a, in which the pressure has dropped. The fluid grants the freedom for the gears to rotate up to a certain limit. If the gears rotate faster, the fluid acts as a brake and prevents it as there is only little space between the gear segments.

In another method as shown in FIG. 4, the inlet and outlet ducts must be connected through a circuit or the channel 128 and a control valve 130 is installed in the circuit wherein the pump 100 and the circuit are vacuumed and filled with fluid. In this case, the internal circulation of the pump 100 will be at its lowest and this could be achieved by lowering the allowed clearance between the segments or increasing the viscosity of the fluid. And this way, the fluid is configured to pass through the circuit as it is attempting to move from the high-pressure region 120a to the low-pressure region 120b. Then, the amount of fluid passing through the circuit could be controlled by the control valve 130.

Figure 5:
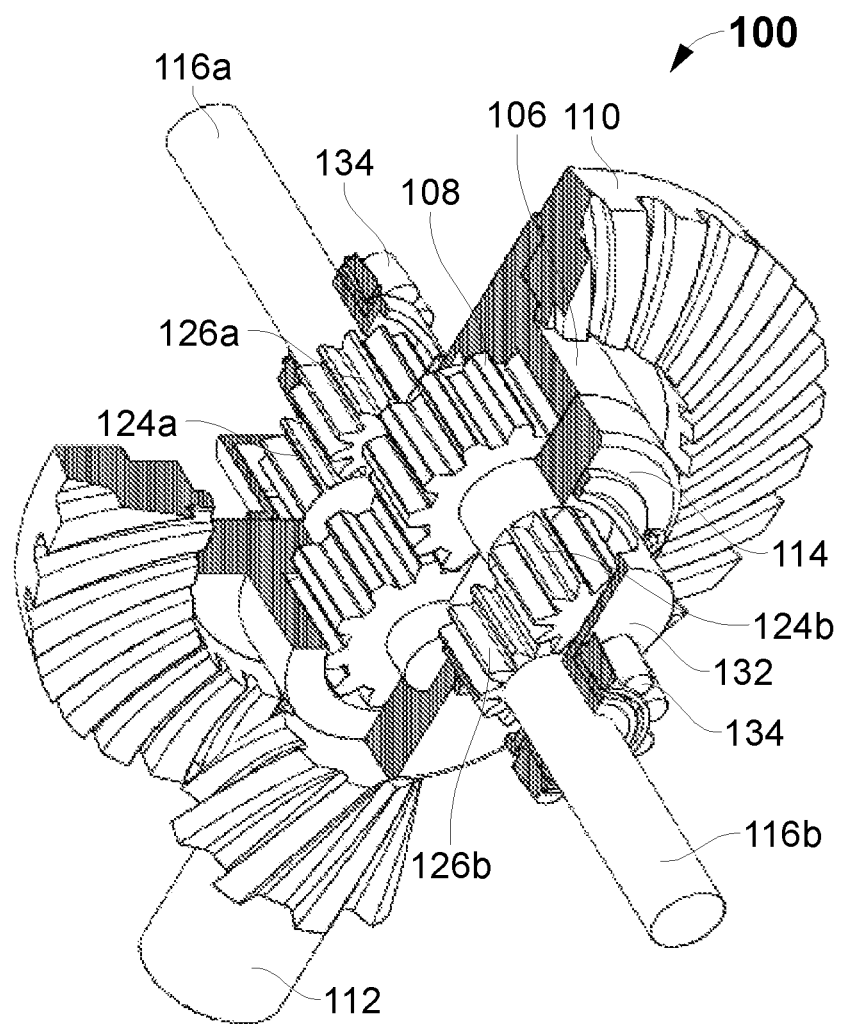
FIG. 5 shows the sectional view of the positive displacement pump showing a plug member affixed to the casing, according to another embodiment.

In a different embodiment as shown in FIG. 5, the preferred configuration of the positive displacement pump 100 for hydraulic limited differential is disclosed. the two external gears (102, 104) are involute gears are mounted side by side juxtaposedly inside the casing 106 which is attached to the body of the pump 100. The countersinks (120a, 120b) are created on both side of the external gears (102, 104) and the casing 106 is tightly sealed using the plug member 114 for the closed-circuit configuration. The opening 118 disposed on the casing 106 acts as an inlet and outlet for the flow of liquid inside the casing 106 as shown in FIG. 2. The casing 106 is filled with the fluid and the rotation of external gears (102, 104) inside the casing 106 driven by the crown wheel 110 is configured to move the locked fluid from high pressure countersink 120a to low pressure countersink 120b which decreases the pressure in high pressure countersink 120a and at the same time increases the pressure in low pressure countersink 120b. This leads to pressure difference to cause the fluid to circulate internally through the permitted gaps and slips between the parts from high pressure countersink 120a to low pressure countersink 120b as shown in FIG. 4. This is the internal circulation of the pump 100 to control the differential slip in the vehicle.

In another embodiment which illustrates the sectional view of the positive displacement pump, if the fluid inside the casing 106 could not penetrate from high pressure countersink 120a to low pressure countersink 120b, the gears inside the casing could not rotate and gets locked. In other words, the differential in the vehicle is locked when the internal circulation of the fluid in the pump 100 is minimum.

Figure 6:
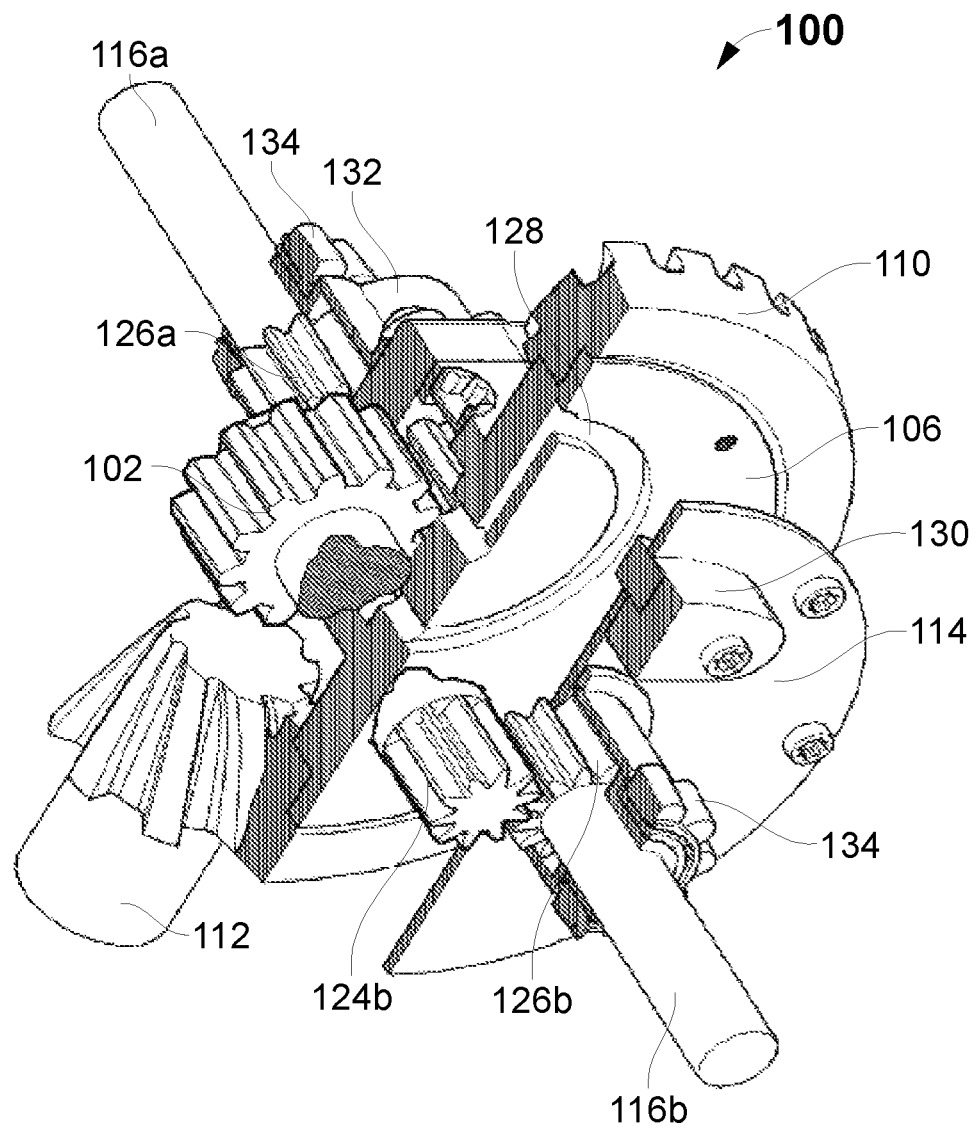
FIG. 6 shows the sectional view of the positive displacement pump showing a channel and a valve, according to another embodiment.

In one embodiment as shown in FIG. 6, the positive displacement pump 100 for hydraulic limited differential comprises a channel 128 disposed in the casing 106 to control the movement of the fluid based on the internal circulation. The channel 128 is configured to connect the fluid inlet and outlet in the casing to define a closed circuit. The channel 128 in the casing 106 is configured to connect the countersinks (120a, 120b) that causes the internal circulation of the fluid due to pressure difference. Further, in another embodiment of the present invention, a valve 130 disposed in the channel 128 of the closed circuit 106 configured to control the movement of the fluid inside the casing 128 to improve the performance and for more precise differential control. The valve 130 is added in the closed circuit. The differential in the vehicle is configured to be open when the channel 128 is open for movement of the fluid based on the internal circulation in the pump 100.

In one embodiment, the pump 100 used for the hydraulic limited differential is a kind of hydraulic pump is integrated with the crown wheel 110, and the axle shafts are connected to the pump 100 on both the sides. The crown wheel 110 is fixed on the shaft of the pump 100 and takes the receiving force from the pinion 112 as shown in FIG. 6, and transmits it via the pump 100 to the axle shafts. However, variety of hydraulic pumps made in different configuration could be added to the invention to achieve desired results with the same efficiency, without deviating from the aspects of the present invention.

In an exemplary embodiment as shown in FIG. 6, a working variant of the positive displacement pump 100 for hydraulic limited differential is disclosed. An external gear pump (102, 104) with two shafts is used wherein two identical and interconnected gears are configured.

Figure 7:
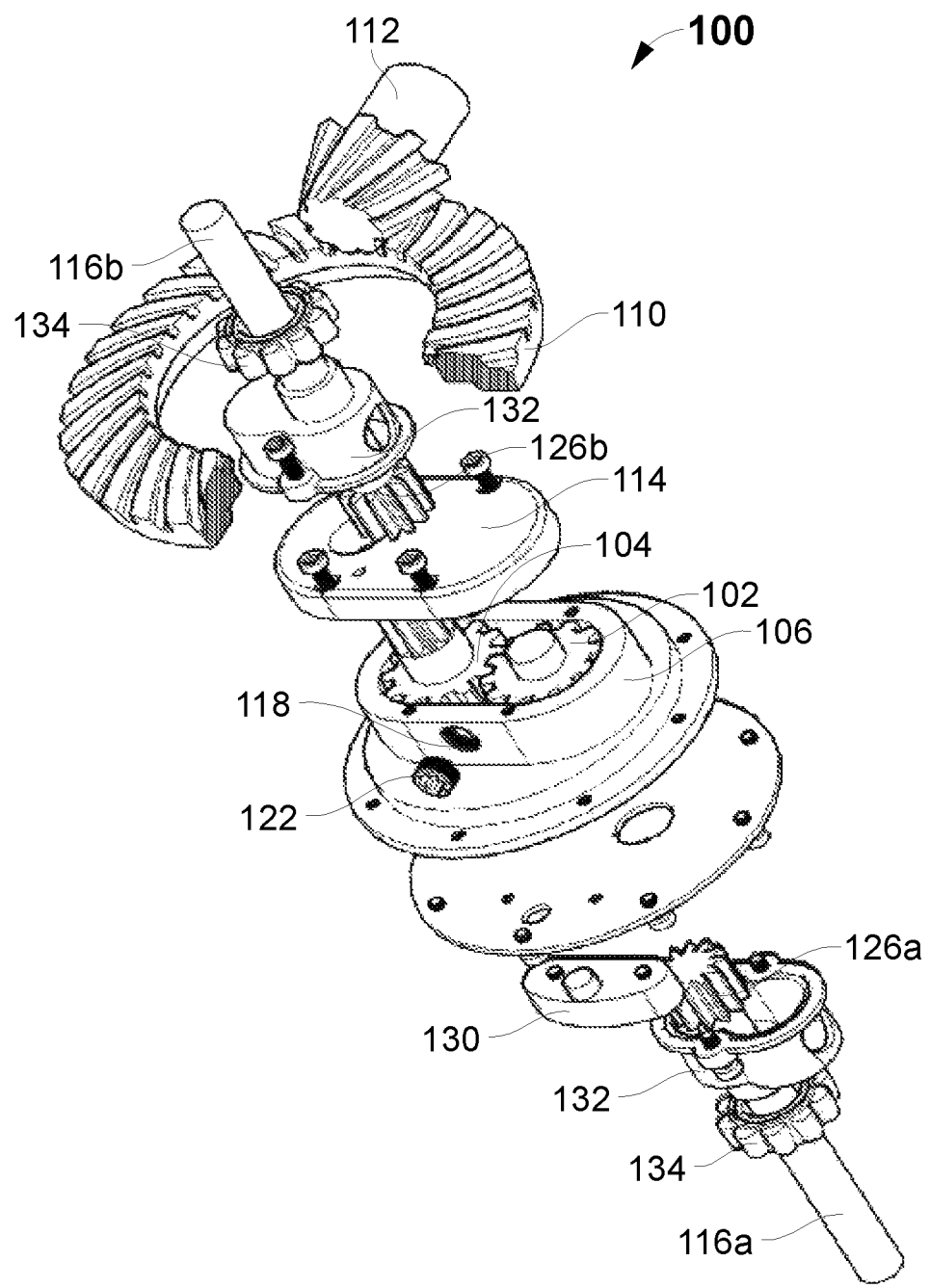
FIG. 7 shows the exploded view of the positive displacement pump showing all the components, according to another embodiment.

In the same embodiment as shown in FIG. 7, various methods are used to join the axle shafts with the crown wheel 110 for differential alignment. In the present invention, axle shaft alignment with the crown wheel 110 is disclosed. However, this method is an example disclose here and not limited to the specific methods shown. Other methods of arrangement of the axle shafts with the pump 100 could also be considered.

As shown in FIG. 7, a positive displacement pump 100 for hydraulic limited differential in a vehicle using four gears is disclosed. A first external gear 102 and a second external gear 104 juxtaposed inside a casing 106, wherein one or more outer teeth sections 108 of the external gear (102, 104) are tangential to the casing 106. A crown wheel 110 is configured to encompass the casing 106 and takes the receiving force from a pinion 112 to drive the axle shafts of the vehicle via the positive displacement pump 100, wherein the axle shafts are configured to couple the first external gear 102 and the second external gear 104 respectively. A pair of side gears (124a, 124b) mounted on a shaft extending from the first external gear 102 and the second external gear 104 and a pair of support gears (126a, 126b) are mounted on the axle shafts of the vehicle, wherein the support gears (126a, 126b) are coupled to the first external gear 102 and the second external gear 104 respectively for concentric alignment with the crown wheel 110.

As shown in FIG. 2, the casing 106 is filled with a fluid via an opening 118 and sealed using a plug member 114 on both sides to define a closed circuit. The clockwise rotation of the first external gear 102 is configured to drive the second external gear 104 in counter clockwise direction in the casing 106 to allow the movement of the fluid inside the casing 106, One or more countersinks (120a, 120b) are created on both sides of the first external gear 102 and the second external gear 104, wherein the movement of the fluid in the casing 106 via a channel 128 from a high-pressure countersink 120a to a low-pressure countersink 120b creates a pressure difference to circulate the fluid internally via the permitted gaps and the slips to control the differential slip for increasing the stability of the driving vehicle.

In additional embodiments as shown in FIG. 7, the side gears (124a, 124b) and support gears (126a, 126b) are enclosed by a shell member 132 and fixedly attached to the plug member 114 of the casing 106. The shell member 132 is configured to cover the side gears (124a, 124b) and support gears (126a, 126b) for additional protection from any external damages. The opening 118 is blocked by the coupling 122 to caulk the space inside the shell in proportion to the outside the shell member 132. All the components of the pump with the gear assembly and the casing are placed on the shell member of the differential using these barrel bearings 134.

According to the present invention, in the preferred method, the shafts (116a, 116b) from the first external gear 102 and the second external gear 104 are removed and axle shafts of the vehicle are connected to the respective external gears. The shafts (116a, 116b) are removed from either side by disassembling the plug member 114 and the side members of the casing 106 as shown in FIG. 6. A pair of side gears (124a, 124b) are attached to the axle shaft connected to the first external gear 102 and the second external gear 104 as shown in FIG. 2. These side gears (124a, 124b) are concentrically aligned with another set of support gears (126a, 126b) which are concentric with the crown wheel 110. In this way, the differential is prepared relying on the internal circulation of the pump 100. The implementation of the channel 128 for the movement of the fluid in the casing 106 is configured to activate when the internal circulation of the pump 100 is less than the required level. A valve 130 disposed in the channel 128 of the closed circuit in the casing 106 of the pump 100 is electronically controlled to selectively adjust the movement of the fluid inside the casing 106 to limit the differential slip and this also helps in deactivating the limited slip differential based on the requirements.

One aspect of the present disclosure is directed to a positive displacement pump 100 for hydraulic limited differential in a vehicle, comprising a first external gear 102 and a second external gear 104 juxtaposed inside a casing 106, wherein one or more outer teeth sections 108 of the external gear are tangential to the casing 106; a crown wheel 110 is configured to encompass the casing and takes the receiving force from a pinion 112 to drive the axle shafts of the vehicle via the positive displacement pump 100; and wherein the casing 106 is filled with a fluid via an opening 118 and sealed using a plug member 114 on both sides to define the fluid tight sealing configuration.

The positive displacement pump further comprises a pair of shafts (116a, 116b) are configured to couple the first external gear 102 and the second external gear 104, wherein the clockwise rotation of the first external gear 102 is configured to drive the second external gear 104 in counter clockwise direction in the casing 106 to allow the movement of the fluid inside the casing 106; and one or more countersinks (120a, 120b) are created on both sides of the first external gear 102 and the second external gear 104, wherein the movement of the fluid in the casing 106 creates a pressure difference in the countersinks (120a, 120b) to circulate the fluid internally via the permitted gaps and the slips to control the differential slip for increasing the stability of the driving vehicle.

The fluid could be an oil having a predetermined viscosity based on the configuration of the pump 100. The fluid could be configured to move from the high-pressure countersink 120a to the low-pressure countersink 120b to create the pressure difference to cause internal circulation of the fluid during the movement of the vehicle. The amount of fluid movement from the high-pressure countersink 120a to the low-pressure countersink 120b could be directly proportional to the rate of differential for the slip in the vehicle. A pair of side gears (124a, 124b) mounted on a shaft extending from the first external gear 102 and the second external gear 104 and a pair of support gears (126a, 126b) could be mounted on the axle shafts of the vehicle. One or more barrel bearings 134 could be positioned concentrically with the crown wheel. The axle shafts of the vehicle could be connected to the support gears (126a, 126b) for transferring the traction force for differential adjustment to control the slip in the vehicle.

In additional embodiments as shown in FIG. 6, the valve 130 is configured to limit the differential slip in at least one of a manual and an automatic method depending on the stability requirements of the vehicle. The position of the valve 130 is configured in the channel 128 to control the flow of the fluid. The valve 130 could be able to cut, connect or restrict the movement of the fluid in the channel 128 from high-pressure countersink 120a to the low-pressure countersink 120b. If the internal circulation of the pump 100 is the least possible amount, the differential will be locked when the channel 128 is terminated. If the channel 128 is completely open, the differential acts like an open differential and the valve 130 is configured to restrict the channel 128 so that the differential slip is limited.

In additional embodiments, the performance of the positive displacement pump 100 for hydraulic limited differential in the vehicle is disclosed. When the vehicle moves in a straight line and the tires friction rate is the same, the power of the motor reaches the crown wheel 110 through the pinion 112 and the crown wheel 110 is integrated with the pump 100 which transfers power to the gears. The gears with no rotation when there is no movement of the fluid, deliver power to the axle shafts of the vehicle to move.

In another embodiment, when the vehicle is turning, the tires that are away from the center of the screw tend to rotate with the increased speed while the tires closer to the center, tend to rotate with reduced speed. In this case, the gears of the pump 100 start to work and reduce the tire revolution in the screw and increase the amount of the tire revolution outside the screw. The pump 100 transmits the fluid from the high-pressure countersink 120a to the low-pressure countersink 120b during the transfer of tire movement. In this case, as the pump rotation speed is low, the internal drop in the pump 100 prevents the pressure rise.

According to another embodiment as shown in FIG. 3, when the friction of one of the tires decreases due to its placement on a slippery surface such as ice, it starts to spin faster than a tire with friction. In this case, the pump 100 starts to work at high speeds. Since the fluid pumping rate is higher than the internal loss of the pump 100, the pressure in one of the countersinks (120a, 120b) is increased. This pressure increase prevents the pump revolution from going up. As a result, the pump 100 will act like a brake for the slippery tire. In this case, the slippery tire revolution is higher than the friction tire, but the power transmission continues to both tires. Further, it should be noted that the internal decline amount of the pump 100 determines the amount of the slip allowed for tires. While the internal decline amount of the pump 100 has a direct relation with the amount of gear and shell looseness, it has inverse relation with the viscosity and direct relation to the pressure difference in the countersinks (120a, 120b). In the design of the differential, by controlling these parameters, the permitted differential slip in the tire could be determined.

In additional embodiments as shown in FIG. 6, when one of the tires is levitated from the ground, mostly in off-road vehicles, differential performance is the same as when a tire is placed on the slippery surface. In this case, some of the force will be lost by a tire that is separated from the ground. If we want to minimize the power dissipation in differential, it is required to minimize the internal loss of the pump 100 and using the channel 128 instead of the internal loss of the pump 100. In this case, when we block the channel 128, the differential is locked and the tire that is separated from the ground and the one which rubs the ground starts to spin with the same rotation speed.

In another embodiment, as shown in FIG. 6, the electronic control to utilize the differential is disclosed. The differential slip rate is controlled by the automobile computer. This computer controls the valve 130 with various predetermined parameters from its pattern, and controls the flow rate of the fluid from the channel 128 and restricts, locks or frets the differential slip in the vehicle. The pump 100, according to the present invention, is primarily applied in mechanisms where the rotation period is transmitted to the two wheels with different ratios.

The design of the positive displacement pump 100 for hydraulic limited differential is a very simple structure and does not involve any complex mechanism, thereby eliminating the cumbersome maintenance and repair. The production of the pump 100 is very cheap, and it could be done on the similar lines of the open differential type. As the consumable parts such as clutch plate, spring and backing plates are not used in this differential, the depreciation cost is very less. Therefore, the lifetime of the pump 100 also increases to a desired extent. Although the electronic control in this differential could increase the efficacy, this differential could properly perform duties of a limited slip differential without using the electronic control. However, this electronic control, and the valve 130 allows the pump 100 to be used in both manual and automatic differential slip adjustment methods which gives more flexibility and reliability for the user while driving the vehicle on the slippery surfaces. The differential locking capability allows to cross impassable areas and the design of the pump 100 is completely reliable due to mechanical structure as the idle gears are replaced by the hydraulic pump 100 which alone controls the differential slip very effectively.

In additional embodiments, the positive displacement pump 100 further comprise a channel 128 in the casing 106 to form a closed circuit and to control the movement of the fluid based on the internal circulation. The channel 128 in the casing 106 could be configured to connect the countersinks that causes the internal circulation of the fluid due to pressure difference. The displacement pump 100 further comprise a valve 130 disposed in the casing 106 configured to control the movement of the fluid in the channel 128. The differential in the vehicle could be locked when the internal circulation of the fluid in the pump 100 is minimum. The differential in the vehicle could be configured to be open when the channel 128 is open for movement of the fluid based on the internal circulation in the pump 100.

Another aspect of the present disclosure is directed to a positive displacement pump 100 for hydraulic limited differential in a vehicle, comprising: a first external gear 102 and a second external gear 104 juxtaposed inside a casing 106, wherein one or more outer teeth sections 108 of the external gear are tangential to the casing 106; a crown wheel 110 is configured to encompass the casing 106 and takes the receiving force from a pinion 112 to drive the axle shafts of the vehicle via the positive displacement pump 100, wherein the axle shafts are configured to couple the first external gear 102 and the second external gear 104; and a pair of side gears (124a, 124b) mounted on a shaft extending from the first external gear 102 and the second external gear 104 and a pair of support gears (126a, 126b) are mounted on the axle shafts of the vehicle, wherein the support gears (126a, 126b) are coupled to the first external gear 102 and the second external gear 104 for concentric alignment with the crown wheel 110. The pump 100 could be configured such that the casing 106 is filled with a fluid and sealed using a plug member 114 on both sides to define a closed circuit; and the clockwise rotation of the first external gear 102 is configured to drive the second external gear 104 in counter clockwise direction in the casing 106 to allow the movement of the fluid inside the casing 106.

One or more countersinks (120a, 120b) could be created on both sides of the first external gear 102 and the second external gear 104, wherein the movement of the fluid in the casing 106 via a channel 128 from a high-pressure countersink 120a to a low-pressure countersink 120b creates a pressure difference to circulate the fluid internally via the permitted gaps and the slips to control the differential slip for increasing the stability of the driving vehicle.

The side gears (124a, 124b) and support gears (126a, 126b) could be enclosed by a shell member 132 and fixedly attached to the plug member 114 of the casing 106. A valve 130 could be disposed in the casing 106 of the pump 100 and be electronically controlled to selectively adjust the movement of the fluid in the channel 128 to limit the differential slip. One or more barrel bearings 134 are configured to be disposed along the shell member 132 to provide additional support for positioning of all the segments in the pump 100. The valve 130 could be configured to limit the differential slip in at least one of a manual and an automatic method depending on the stability requirements of the vehicle.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A positive displacement pump for hydraulic limited differential in a vehicle, comprises:
   a first external gear and a second external gear juxtaposed inside a casing, wherein one or more outer teeth sections of the external gears are tangential to the casing;
   a crown wheel is configured to encompass the casing and takes a receiving force from a pinion to drive axle shafts of the vehicle via the positive displacement pump;
   wherein the casing is filled with a fluid via an opening and sealed using a plug member on both sides to define a fluid tight sealing configuration;
   a pair of shafts are configured to couple the first external gear and the second external gear, wherein the clockwise rotation of the first external gear is configured to drive the second external gear in counter clockwise direction in the casing to allow movement of the fluid inside the casing; and
   a channel is disposed in the casing configured to connect one or more countersinks created on all sides of the first external gear and the second external gear respectively, wherein the movement of the fluid in the casing creates a pressure difference in the countersinks to circulate the fluid internally via permitted gaps and slips to control a differential slip.

2. The positive displacement pump of claim 1, wherein the fluid is an oil having a predetermined viscosity based on a configuration of the pump.

3. The positive displacement pump of claim 1, wherein the fluid is configured to move from a high-pressure countersink to a low-pressure countersink to create the pressure difference to cause internal circulating of the fluid during the movement of the vehicle.

4. The positive displacement pump of claim 1, wherein the amount of fluid movement from a high-pressure countersink to a low-pressure countersink is directly proportional to the rate of the differential slip in the vehicle.

5. The positive displacement pump of claim 1, wherein an inlet and an outlet in the casing for the movement of the fluid is closed to control the differential slip based on the internal circulation of fluid by the pump.

6. The positive displacement pump of claim 1, wherein a coupling is configured to seal the opening to caulk the space inside the casing.

7. The positive displacement pump of claim 1, wherein a pair of side gears mounted on a shaft extending from the first external gear and the second external gear and a pair of support gears are mounted on the axle shafts of the vehicle.

8. The positive displacement pump of claim 7, wherein one or more support gears are positioned concentrically with the crown wheel.

9. The positive displacement pump of claim 1, wherein the axle shafts of the vehicle are connected to support gears for transferring a traction force for differential adjustment to control the differential slip in the vehicle.

10. The positive displacement pump of claim 1, wherein the opening in the casing defines an entry and bleeding path for a flow of the fluid inside the casing.

11. The positive displacement pump of claim 1, wherein the channel is configured to connect a fluid inlet and outlet in the casing to define a closed circuit.

12. The positive displacement pump of claim 1, further comprises a valve disposed in the channel of a closed circuit configured to control the movement of the fluid inside the casing.

13. The positive displacement pump of claim 1, wherein the differential in the vehicle is locked when the internal circulation of the fluid in the pump is minimum.

14. The positive displacement pump of claim 1, wherein the differential in the vehicle is configured to be open when the channel is open for movement of the fluid based on the internal circulation of fluid by the pump.

15. A positive displacement pump for hydraulic limited differential in a vehicle, comprises:
   a first external gear and a second external gear juxtaposed inside a casing, wherein one or more outer teeth sections of the external gears are tangential to the casing;
   a crown wheel is configured to encompass the casing and takes a receiving force from a pinion to drive axle shafts of the vehicle via the positive displacement pump, wherein the axle shafts are configured to couple the first external gear and the second external gear;
   a pair of side gears mounted on a shaft extending from the first external gear and the second external gear and a pair of support gears are mounted on the axle shafts of the vehicle, wherein the support gears are coupled to the first external gear and the second external gear for concentric alignment with the crown wheel;
   wherein the casing is filled with a fluid via an opening and sealed using a plug member on both sides to define a fluid tight sealing configuration;
   wherein a clockwise rotation of the first external gear is configured to drive the second external gear in counter clockwise direction in the casing to allow movement of the fluid inside the casing; and
   a high-pressure countersink and a low-pressure countersink are created on all sides of the first external gear and the second external gear respectively, wherein movement of the fluid in the casing via a channel from the high-pressure countersink to the low-pressure countersink creates a pressure difference to circulate the fluid internally via permitted gaps and slips to control a differential slip.

16. The positive displacement pump of claim 15, wherein the side gears and support gears are enclosed by a shell member and rotatably attached to the plug member of the casing.

17. The positive displacement pump of claim 15, wherein a valve disposed in the channel of to a closed circuit is electronically controlled to selectively adjust the movement of the fluid inside the casing to limit the differential slip.

18. The positive displacement pump of claim 17, wherein the valve is configured to limit the differential slip in at least one of a manual and an automatic method depending on the stability requirements of the vehicle.

\* \* \* \* \*